United States Patent
Kim et al.

(10) Patent No.: US 9,986,294 B2
(45) Date of Patent: May 29, 2018

(54) DISPLAY DEVICE FOR DISPLAYING CONTENTS, SERVER DEVICE FOR PROVIDING SERVICE BASED ON RATINGS OF CONTENTS, AND METHODS THEREOF

(71) Applicant: SAMSUNG ELECTRONICS CO., LTD., Suwon-si (KR)

(72) Inventors: In-ji Kim, Uijeongbu-si (KR); Eun-seok Choi, Anyang-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 14/299,053

(22) Filed: Jun. 9, 2014

(65) Prior Publication Data
US 2015/0095949 A1    Apr. 2, 2015

(30) Foreign Application Priority Data
Sep. 27, 2013   (KR) .................. 10-2013-0115692

(51) Int. Cl.
*H04N 7/16* (2011.01)
*H04H 60/33* (2008.01)
(Continued)

(52) U.S. Cl.
CPC ....... *H04N 21/4756* (2013.01); *H04N 21/251* (2013.01); *H04N 21/252* (2013.01); *H04N 21/2665* (2013.01); *H04N 21/4126* (2013.01); *H04N 21/42224* (2013.01); *H04N 21/4314* (2013.01); *H04N 21/4316* (2013.01); *H04N 21/44222* (2013.01); *H04N 21/4622* (2013.01); *H04N 21/4667* (2013.01);
(Continued)

(58) Field of Classification Search
CPC ............ H04N 21/252; H04N 21/2665; H04N 21/4126; H04N 21/42224
USPC ........................................ 725/35, 40, 43, 47
See application file for complete search history.

(56) References Cited

U.S. PATENT DOCUMENTS 7,792,828 B2    9/2010   Roegner
8,607,262 B2 *  12/2013  Hallberg ............ H04N 7/17318
                                                             725/14
(Continued)

FOREIGN PATENT DOCUMENTS

WO    2010/025181 A1    3/2010

OTHER PUBLICATIONS

Search Report dated Sep. 29, 2014, issued by the International Searching Authority in counterpart International Application No. PCT/KR2014/005633.
(Continued)

*Primary Examiner* — Mushfikh Alam
*Assistant Examiner* — Jaycee Imperial
(74) *Attorney, Agent, or Firm* — Sughrue Mion, PLLC

(57) ABSTRACT

A display device and method of displaying content on the display device are provided. The display device includes: a communicator configured to transmit information related to content displayed on a display to a server device and receive information on a highest rating content from the server device; and a controller configured to display a user interface (UI) object, which enables a user to change the content to the highest rating content on the display, in response to determining that the content is not the highest rating content.

12 Claims, 21 Drawing Sheets

(51) Int. Cl.

| | | |
|---|---|---|
| *H04H 60/32* | (2008.01) | |
| *G06F 3/00* | (2006.01) | |
| *G06F 13/00* | (2006.01) | |
| *H04N 5/445* | (2011.01) | |
| *H04N 21/475* | (2011.01) | |
| *H04N 21/431* | (2011.01) | |
| *H04N 21/466* | (2011.01) | |
| *H04N 21/25* | (2011.01) | |
| *H04N 21/2665* | (2011.01) | |
| *H04N 21/462* | (2011.01) | |
| *H04N 21/442* | (2011.01) | |
| *H04N 21/41* | (2011.01) | |
| *H04N 21/422* | (2011.01) | |
| *H04N 21/482* | (2011.01) | |
| *H04N 21/488* | (2011.01) | |

(52) U.S. Cl.
CPC ..... *H04N 21/4668* (2013.01); *H04N 21/4826* (2013.01); *H04N 21/4882* (2013.01)

(56) References Cited

U.S. PATENT DOCUMENTS

| | | | | |
|---|---|---|---|---|
| 8,839,278 | B2* | 9/2014 | Wang | G06Q 10/063 725/105 |
| 2003/0226146 | A1 | 12/2003 | Thurston et al. | |
| 2007/0136751 | A1* | 6/2007 | Garbow | H04N 7/173 725/46 |
| 2007/0266401 | A1 | 11/2007 | Hallberg | |
| 2008/0294640 | A1 | 11/2008 | Yost et al. | |
| 2009/0007179 | A1* | 1/2009 | Angiolillo | H04N 5/4403 725/44 |
| 2009/0021474 | A1* | 1/2009 | Bentley | H04N 7/17318 345/156 |
| 2009/0025025 | A1* | 1/2009 | Vleck | H04L 12/66 725/14 |
| 2010/0131969 | A1* | 5/2010 | Tidwell | H04H 60/31 725/14 |
| 2011/0153602 | A1 | 6/2011 | Kiddle et al. | |
| 2012/0150683 | A1 | 6/2012 | Herrington | |
| 2012/0192217 | A1 | 7/2012 | Jeong et al. | |
| 2013/0036165 | A1 | 2/2013 | Tseng et al. | |
| 2013/0117773 | A1* | 5/2013 | Davies | H04N 21/252 725/14 |
| 2013/0227441 | A1* | 8/2013 | Cockcroft | G06F 17/30873 715/760 |
| 2015/0074718 | A1* | 3/2015 | Moguillansky | H04N 21/482 725/40 |

OTHER PUBLICATIONS

Written Opinion dated Sep. 29, 2014, issued by the International Searching Authority in counterpart International Application No. PCT/KR2014/005633.

Communication dated Nov. 24, 2016 issued by the European Patent Office in counterpart Patent Application No. 14847424.0.

Communication dated Jan. 23, 2018, issued by the European Patent Office in counterpart Patent Application No. 14847424.0.

* cited by examiner

DISPLAY DEVICE FOR DISPLAYING CONTENTS, SERVER DEVICE FOR PROVIDING SERVICE BASED ON RATINGS OF CONTENTS, AND METHODS THEREOF

CROSS-REFERENCE TO RELATED APPLICATION

This application claims the benefit under 35 U.S.C. § 119(a) of Korean patent application No. 10-2013-0115692, filed on Sep. 27, 2013 in the Korean Intellectual Property Office, the entire disclosure of which is hereby incorporated by reference in its entirety.

TECHNICAL FIELD

Apparatuses and methods consistent with exemplary embodiments relate to a display device, a server device, and methods thereof, and more particularly, to a display device which displays contents, a server device which provides a service based on ratings of contents, and methods thereof.

BACKGROUND

With the development of electronic technologies, display devices equipped with various kinds of functions have been developed and distributed. In particular, as the performance of general display devices such as televisions (TVs) has greatly improved, display devices have been developed which provide various services through large and clear displays.

In recent years, in addition to a variety of broadcasting service channels provided by existing public broadcasting stations, various types of content such as cable broadcasts provided by cable broadcast providers and IP contents provided by IP servers have been provided to the display apparatuses. Accordingly, the number of contents selectable by users has increased.

That is, as the number of viewable contents has increased, options selectable by users have also increased. In this respect, however, with the increase of content, users are more likely to miss the most popular content.

In particular, when various contents are provided on various channels and a user wants to view only an interesting part of each content, the user is required to repeatedly tune to the various channels one by one, which may cause an inconvenience to the user.

Accordingly, there is a demand for a method of providing various services based on ratings of contents.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display device and a server device which can provide various services according to ratings of contents, and a method thereof.

According to an aspect of an exemplary embodiment, there is provided a display device including: a communicator configured to transmit information related to content displayed on a display to a server device and receive information on a highest rating content from the server device; and a controller configured to display a user interface (UI) object, which enables a user to change the content to the highest rating content on the display, in response to determining that the content is not the highest rating content.

The controller may be configured to display rating information of the content on the display in response to determining that the content displayed on the display is the highest rating content.

The controller may be configured to control the communicator to transmit region information of a region where the display device is located and time information to the server device along with the information related to the content. The highest rating content may be content that satisfies at least one condition of a first condition in which the content has highest real time ratings from among contents which are viewed in real time in the region where the display device is located, a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other contents by more than a predetermined fourth threshold.

The UI object may be displayed on a border of a screen of the display. The UI object may include a message regarding the highest rating content and a menu which enables a user to change the content to the highest rating content.

The UI object may include a circular object that is displayed on a corner in a screen of the display. In response to determining that a user manipulation is input for the circular object, the controller may be configured to display the highest rating content superimposed over a portion of the content in a Picture-In-Picture (PIP) form or a Picture-By-Picture (PBP) form, and move a display position of the circular object.

The UI object may be a highlight mark that is displayed on a boundary part of a border of a screen of the display. When the highlight mark is displayed and in response to determining that a touch manipulation in a predetermined direction is input on a touch screen provided on a remote controller for controlling the display device, the controller may change the content to the highest rating content.

When the UI object is displayed and in response to determining that a predetermined user manipulation is input on a remote controller for controlling the display device, the controller may change the content to the highest rating content.

The display device may further include a storage configured to store information on the highest rating content. The controller may be configured to display a recommendation message to recommend a user to view the highest rating content on the display based on the information stored in the storage in response to an occurrence of a predetermined event.

According to an aspect of another exemplary embodiment, there is provided a server device including: a rating collector configured to collect ratings of a plurality of contents which are viewed through a plurality of display devices; and a server controller configured to select content, from the plurality of contents, that has ratings satisfying a predetermined condition from among the collected ratings and is thereby determined to be a highest rating content, and notify the plurality of display devices of the highest rating content.

The server controller may be configured to select as the highest rating content a content that has a rating satisfying at least one condition of a first condition in which the content has highest real time ratings from among contents which are viewed in real time, a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other content by more than a predetermined fourth threshold.

The rating collector may include: a communicator configured to receive content information that is viewed in each display device, viewing time information, and region information from the plurality of display devices; a rating calculator configured to calculate ratings of each of the plurality of contents using the content information, the viewing time information, and the region information received through the communicator; and a rating storage configured to store the calculated ratings.

The rating collector may receive ratings of the plurality of contents from a rating survey agency.

The server device may further include a storage configured to store information related to the highest rating content. Every time that a predetermined time period arrives, the server controller may be configured to provide recommendation content information to the plurality of display devices based on the information stored in the storage.

According to an aspect of still another exemplary embodiment, there is provided a method for displaying content of a display device, the method including: displaying content; transmitting information related to the content to a server device; receiving information related to a highest rating content from the server device; and displaying a user interface (UI) object, which enables a user to change the content to the highest rating content, in response to determining that the content is not the highest rating content.

The method may further include displaying rating information of the content in response to determining that the content displayed on the display is the highest rating content.

The method may further include transmitting region information of a region where the display device is located and time information to the server device. The highest rating content may be a content that satisfies at least one condition of a first condition in which the content has highest real time ratings from among contents which are viewed in real time in the region where the display device is located, a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other content by more than a predetermined fourth threshold.

The UI object may be displayed on a border of a screen of the display, and the UI object may include a message regarding the highest rating content and a menu which enables a user to change the content to the highest rating content.

The UI object may include a circular object that is displayed on a corner in a screen of the display. The displaying the content may include, in response to determining that a user manipulation is input for the circular object, displaying the highest rating content superimposed over the content in a Picture-In-Picture (PIP) form or a Picture-By-Picture (PBP) form, and moving a display position of the circular object.

The UI object may be a highlight mark that is displayed on a boundary part of a border of a screen of the display. The displaying the content may include, when the highlight mark is displayed and in response to determining that a touch manipulation is input in a predetermined direction on a touch screen provided on a remote controller for controlling the display device, changing the content to the highest rating content.

The method may further include, when the UI object is displayed and in response to determining that a predetermined user manipulation is input on a remote controller for controlling the display device, changing the content to the highest rating content.

The method may further include: storing information on the highest rating content, and displaying a recommendation message to recommend a user to view the highest rating content based on the stored information in response to an occurrence of a predetermined event.

According to an aspect of still another exemplary embodiment, there is provided a method for providing a service of a server device, the method including: collecting ratings of a plurality of contents which are viewed through a plurality of display devices; selecting content, from among the plurality of contents, that has ratings satisfying a predetermined condition from among the collected ratings and is thereby determined to be a highest rating content; and notifying the plurality of display devices of the highest rating content.

The predetermined condition may include at least one condition of a first condition in which the content has highest real time ratings from among contents which are viewed in real time, a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other content by more than a predetermined fourth threshold.

The collecting of the ratings may include: receiving content information related to content viewed in each of the plurality of display devices, viewing time information, and region information from the plurality of display devices; calculating ratings of each of the plurality of contents using the content information, the viewing time information, and the region information; and storing the calculated ratings.

The collecting of the ratings may include receiving ratings of the plurality of contents from a rating survey agency.

The method may further include: storing information on the highest rating content; and providing recommendation content information to the plurality of display devices based on the stored information in response to an elapsing of a predetermined time period.

According to various exemplary embodiments described above, the user watching the display device may directly ascertain ratings of the current content or directly change to another content having the highest ratings. Accordingly, the user can enjoy various services based on the contents.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
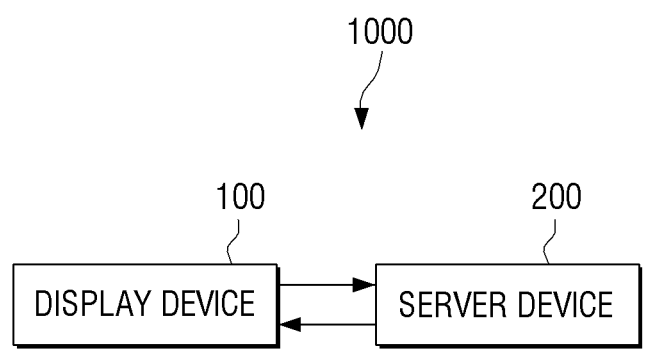
FIG. 1 is a view illustrating a configuration of a service providing system according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as a detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a service providing system according to an exemplary embodiment. Referring to FIG. 1, a service providing system 1000 includes a display device 100 and a server device 200.

The display device 100 may be implemented as various kinds of devices equipped with a display, such as a TV, a personal computer (PC), a laptop PC, a mobile phone, a tablet PC, an MP3 player, an electronic album, a kiosk, etc. A single display device 100 is illustrated in FIG. 1. However, the example shown in FIG. 1 is merely for convenience of explanation, and it is understood that a plurality of display devices may be connected with the single server device 200 and configure the service providing system 1000.

The server device 200 may be implemented as a device that communicates with the display device 100 and provides various services to the display device 100. Specifically, the server device 100 may be a server that is run by a manufacturer of the display device 100, a server that is run by a content creator, a server that is run by a rating survey agency, a social network service server, a cloud server, etc.

The display device 100 may display various contents according to a user selection. Specifically, the display device 100 may display a broadcasting content received through a broadcasting channel, a content received from an IP server through an IP network, a content played back from a recording medium playback device, etc.

When the display device 100 displays the content, the display device 100 may transmit information on the content to the server device 200.

The server device 200 may collect information on contents which are output from various display devices connected to the server device 200. Accordingly, the server device 200 may determine a highest rating content. The highest rating content refers to a content that has the highest ratings in a predetermined time basis (e.g., year, month, week, day, hour, minutes, seconds, real time). The server device 200 sets a condition for determining the highest rating content in advance, and selects a content having the ratings satisfying the condition as the highest rating content.

For example, the condition may be a first condition in which the content has the highest ratings from among contents output at the same time. The condition may be a second condition in which the content has the highest ratings from among the contents output at the same time and the content's own highest ratings exceed a predetermined first threshold. Also, the condition may be a third condition in which a change rate in the real time ratings exceeds a predetermined threshold change rate. Further, the condition may be a fourth condition in which the content's own lowest ratings exceeds a predetermined second threshold from among the contents output at the same time and the change rate in the real time ratings exceeds the predetermined threshold change rate. Moreover, the condition may be a fifth condition in which average ratings from a start time when the content is displayed to an end time at which the content is no longer displayed exceed a predetermined third threshold, or a sixth condition in which the content has ratings greater than the ratings of other content by more than a predetermined fourth threshold. Only one of these conditions may be set, or alternatively, a plurality of the conditions may be set together. For example, when the first condition and the fifth condition are set, the content having the highest ratings from among contents output at the same time and having the highest average ratings from a start time to an end time may be selected as the highest rating content.

When the highest rating content is selected, the server device 200 may provide information on the highest rating content to the display device 100.

When the information on the highest rating content is received, the display device 100 determines whether a currently output content is consistent with (e.g., the same as) the highest rating content. When the current content is not consistent with the highest rating content, the display device 100 informs the viewer that content other than the current content has achieved the highest ratings and provides a user with an opportunity to change the content. For example, the display device 100 may display a user interface (UI) object to enable a user to change to the highest rating content. Accordingly, when the user inputs a user manipulation to change to the highest rating content, the display device 100 changes the content to the highest rating content. As long as there is no user manipulation after the content is changed, the display device 100 may continue outputting the changed content. According to another exemplary embodiment, when a predetermined time elapses after the content is changed or when an output of an important scene is completed, the display apparatus 100 may automatically return to the original channel.

Figure 2:
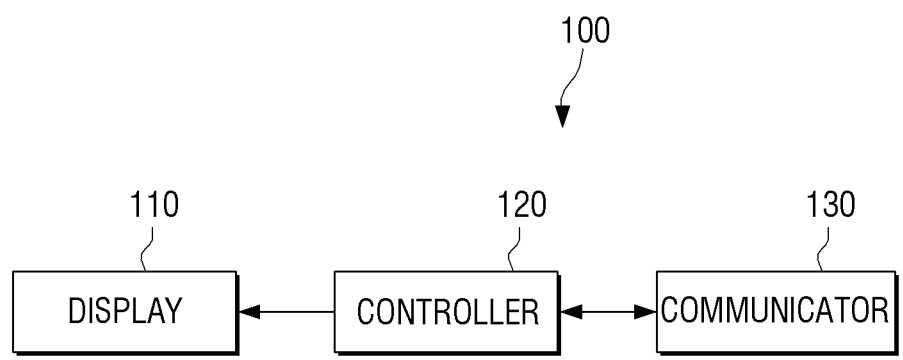
FIG. 2 is a block diagram illustrating a configuration of a display device according to an exemplary embodiment.

FIG. 2 is a block diagram illustrating a configuration of a display device according to an exemplary embodiment. Referring to FIG. 2, a display device 100 includes a display 110, a controller 120, and a communicator 130.

The display 110 is an element that displays contents. As described above, contents may be provided from a variety of sources. Kinds of contents and a receiving method thereof will be explained in detail below with reference to the drawings.

The communicator 130 is an element that communicates with a server device 200. Specifically, the communicator 130 transmits information on content that is output from the display 110 to the server device 200. For example, the communicator 130 may transmit information on a broadcasting channel through which the content is provided, identification information for identifying the content, such as a name, a serial number or an ID, a name of a source device providing the content, an IP address, information on a time when the content is output, Electronic Program Guide (EPG) information, etc. to the server device 200.

The communicator 130 also receives information on a highest rating content from the server device 200. According to an exemplary embodiment, the highest rating content disclosed herein refers to content that is selected by the server device 200 according to various conditions as described above.

The controller 120 is an element that controls an overall operation of the display device 100. When the information on the highest rating content is received, the controller 120 compares the highest rating content with a current content which is being output. When the current content is not consistent with the highest rating content, the controller 120 may display a UI object to change to the highest rating content on the display 110. The UI object may be represented in many different ways, such as, for example, by various graphic menus, messages, indicators, etc., which are selectable by the user.

When the current content is consistent with the highest rating content, the controller 120 may display the rating information on the display 110. However, exemplary embodiments are not limited to this feature. That is, when the current content is consistent with the highest rating content, the controller 120 may alternatively not display any information and may continue to output the current content.

Figure 3:
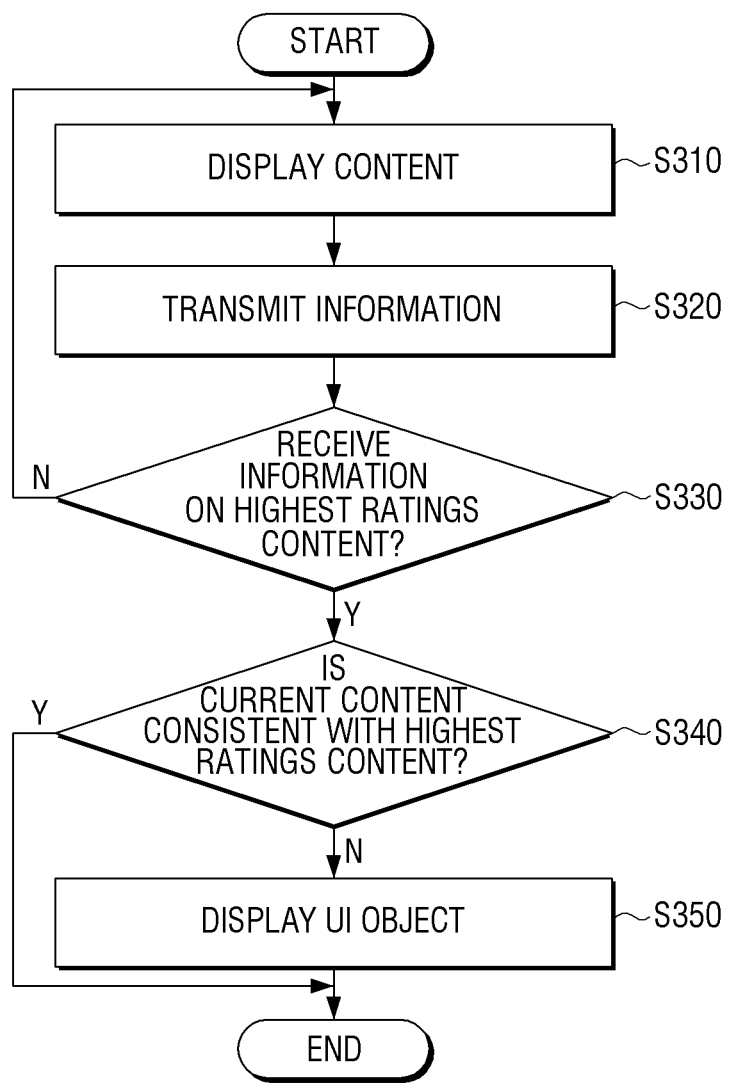
FIG. 3 is a flowchart illustrating a method for displaying content of a display device according to an exemplary embodiment.

FIG. 3 is a flowchart to illustrate a method for displaying content of a display device according to an exemplary embodiment. Referring to FIG. 3, when the display device 100 displays content at operation S310), the display device 100 transmits information on the content to the server device 200 at operation S320. Examples of the information on the content have been described above with reference to FIG. 2, and thus a description thereof is omitted.

Then, when information on a highest rating content is received from the server device 200 at operation S330, the display device 100 determines whether a current content is consistent with the highest rating content at operation S340.

When the current content is not consistent with the highest rating content, the display device 100 displays a UI object to change to the highest rating content at operation S350. Accordingly, the user may directly change the current content to the highest rating content or may change the current content to the highest rating content by using a short cut function provided by the UI object.

When the current content is consistent with the highest rating content, the display device 100 may display ratings of the corresponding content.

As a result, the user can identify content that is more popular than the current content, or issue content in real time, and can directly view the content. Accordingly, the user may not miss an important scene being displayed on other broadcasting channels.

Figure 4:
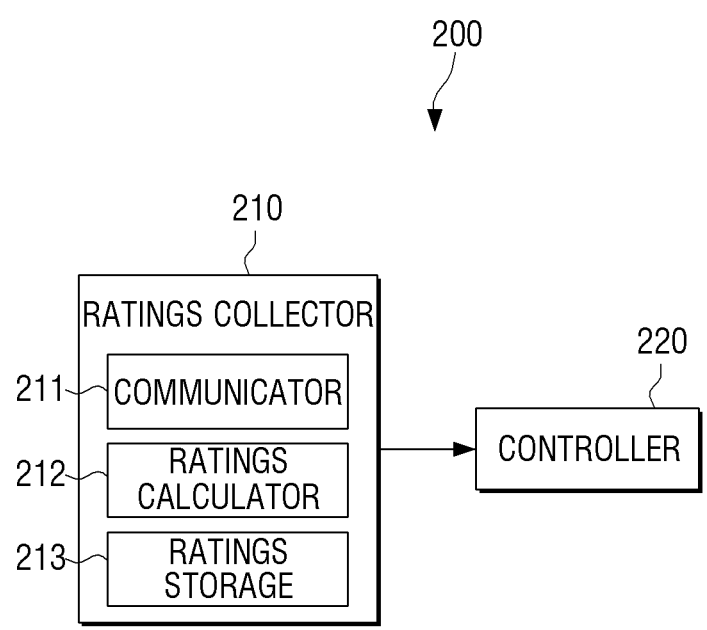
FIG. 4 is a block diagram illustrating a configuration of a server device according to an exemplary embodiment.

FIG. 4 is a block diagram illustrating a configuration of a server device according to an exemplary embodiment. Referring to FIG. 4, a server device 200 includes a rating collector 210 and a controller 220.

The rating collector 210 collects ratings of a plurality of contents that are viewed through a plurality of display devices. According to an exemplary embodiment, the ratings of content refer to a proportion of the number of display devices through which the content is viewed as compared to the total number of display devices managed by the server device 200. The ratings may be calculated as a percentage (%).

The rating collector 210 may include a communicator 211, a rating calculator 212, and a rating storage 213.

The communicator 211 is an element that communicates with a plurality of display devices. The communicator 211 may receive information on currently output contents from the plurality of display devices.

The rating calculator 212 calculates ratings of each of the contents using the content information received through the communicator 211. Specifically, the rating calculator 212 obtains the total number of display devices that transmit the content information, and classifies the plurality of display devices into a plurality of groups according to the same content information. The rating calculator 212 calculates the ratings by comparing the number of devices in each group to the total number.

The rating storage 213 is an element that stores the calculated ratings.

The server controller 220 may select content that has ratings satisfying a predetermined condition from among the calculated ratings as a highest rating content, and may notify the plurality of display devices of the selected content.

The condition may be at least one of various conditions, for example, a first condition in which the content has the highest ratings from among the contents output at the same time, a second condition in which the content has the highest ratings from among the contents output at the same time and the content's highest ratings exceed a predetermined first threshold, a third condition in which a change rate in the real time ratings exceeds a predetermined threshold change rate, a fourth condition in which the content's lowest ratings exceed a predetermined second threshold from among the contents output at the same time and the change rate in the real time ratings exceeds the predetermined threshold change rate, a fifth condition in which average ratings from a start point of the content to an end point of the content exceed a predetermined third threshold, and a sixth condition in which the content has ratings greater than the ratings of other contents by more than a predetermined fourth threshold. It is understood that other types of conditions are available as well.

When the content having the ratings satisfying the set condition is found, the server controller 200 selects the content as the highest rating content and transmits information of the content to each display device. That is, the highest rating content may refer to content that ranks top in the moment ratings, average ratings, or change rate in the ratings. Alternatively, the highest rating content may be referred to in various terms, such as, for example hot issue content, best content, important content, etc.

The server device 200 of FIG. 4 may directly calculate the ratings of the content output from each of the display devices as described above, and may provide various services such as indicating the ratings directly or indicating the content having the ratings.

Figure 5:
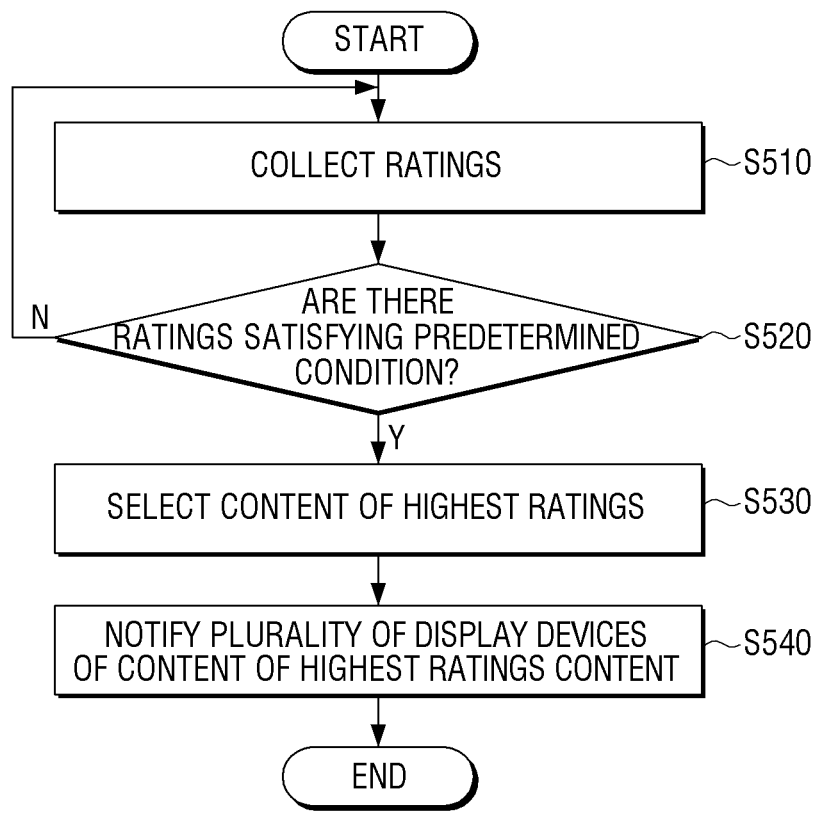
FIG. 5 is a flowchart illustrating a method for providing a service of a server device according to an exemplary embodiment.

FIG. 5 is a flowchart illustrating a method for providing a service of the server device of FIG. 4. Referring to FIG. 5, the server device 200 collects ratings at operation S510. The ratings may be directly calculated by directly identifying the contents which are being viewed through the display devices, as explained in FIG. 4. However, exemplary embodiments are not limited thereto. For example, according to another exemplary embodiment, the server device 200 may receive information on ratings of contents from a ratings survey agency separately provided.

When the ratings are collected, the server device 200 determines whether there are ratings that satisfy a predetermined condition at operation S520. As described above, the condition (or combination of conditions) may be set variously.

When there is content that has the ratings satisfying the condition, the server device 200 selects the content as a highest rating content at operation S530. Accordingly, the server device 200 notifies a plurality of display devices by transmitting information indicating the highest rating content at operation S540.

The plurality of display devices may have corresponding device accounts which are registered at the server device 200, or may be devices that communicate with the server device 200.

Figure 6:
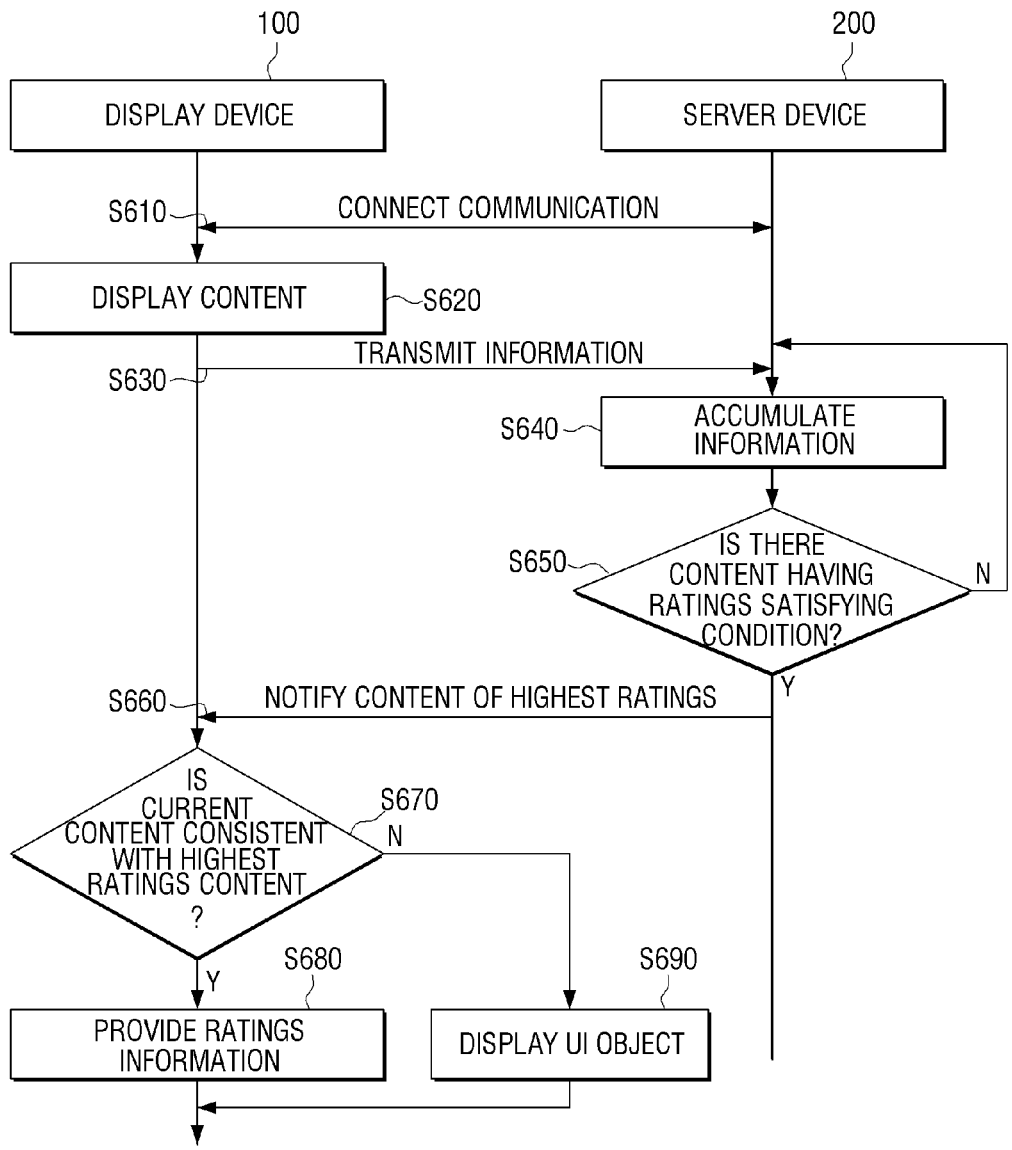
FIG. 6 is a timing chart illustrating an operation of a service providing system according to an exemplary embodiment.

FIG. 6 is a timing chart illustrating a method for providing a service in the system according to an exemplary embodiment. Referring to FIG. 6, the display device 100 and the server device 200 communicate with each other at operation S610). The communication may be established according to various wired or wireless communication methods, and is not limited to any particular technique. For example, the user of the display device 100 may access a web site provided by the server device 200 using a URL corresponding to the server device 200. The user may input the user's ID or password on the web site and may register the user's account at the server device 200. However, the server device 200 does not necessarily collect the ratings of only the registered display devices or provide services to only the registered display devices. For example, the server device 200 may collect ratings of a display device that knows an IP address of the server device 200 or provides certain types of services.

When content is displayed on the display device 100 while the communication is established at operation S620), the display device 100 transmits information on the currently displayed content to the server device 200 at operation S630.

The server device 200 may receive information from a plurality of other display devices besides the display device 100, and may accumulate the information at operation S640.

When a predetermined event occurs, the server device 200 determines whether there is content that has ratings satisfying a predetermined condition at operation S650). The condition may be set variously as described above. The predetermined event may include various events, such as an event in which a predetermined time period elapses (for example, 5 minutes, 10 minutes, etc.), an event in which a rating check request is received from the display device 100, an event in which an operator of the server device 200 inputs a rating check command, an event in which the display device 100 is turned on after having been turned off, an event in which the server device 200 is reset, an event in which the server device 200 is connected with a new display device for communication, etc.

When it is determined that there is content that has the ratings satisfying the predetermined condition at operation S650), the server device 200 selects the content as a highest rating content and notifies the display device 100 of the content at operation S660.

When the current content is consistent with the highest rating content, the display device 100 provides rating information at operation S680. For example, the display device 100 may display a message informing a viewer about a percentage of positive ratings of the current content on a screen or may output a voice signal through a speaker indicating the ratings.

On the other hand, when the current content is not consistent with the highest rating content, the display device 100 displays a UI object at operation S690. The UI object may be displayed through the screen of the display device 100 or may be provided through a remote controller for controlling the display device 100. A method for providing the UI object will be explained in detail below.

In the above-described exemplary embodiments, the display device 100 transmits only the information on the content, that is, the content information, to the server device 200. However, according to another exemplary embodiment, the display device 100 may transmit a variety of information, such as, for example, viewing time information or region information in addition to the content information. Accordingly, a different highest rating content may be selected according to a time zone and a region.

Figure 7:
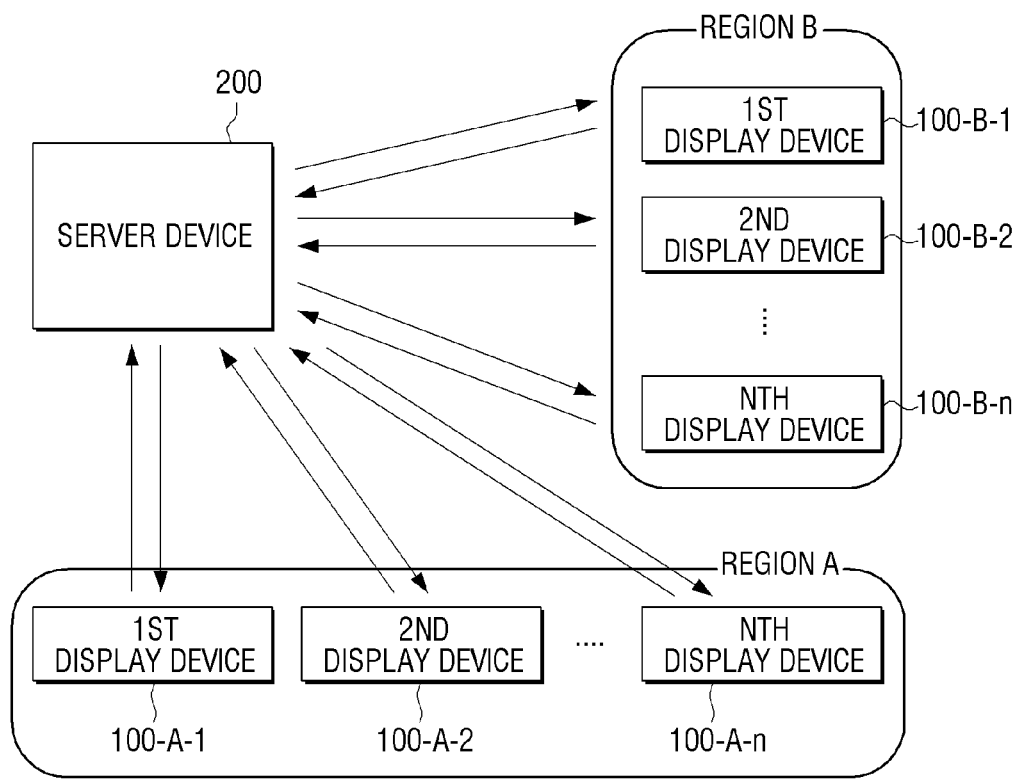
FIG. 7 is a view illustrating a configuration of a service providing system according to another exemplary embodiment.

FIG. 7 is a view illustrating a configuration of a system which provides services to a plurality of display devices located in various regions.

Referring to FIG. 7, the server device 200 may communicate with 1st to Nth display devices 100-A-1 to 100-A-n belonging to an 'A' region, and 1st to Nth display devices 100-B-1 to 100-B-m belonging to a 'B' region.

The display devices of each region transmit viewing time information, region information, EPG information, etc. to the server device 200 along with information on contents which are being viewed.

The rating calculator 212 of the server device 200 may identify the viewing time information and may calculate ratings of contents output at the same time. Also, the rating calculator 212 may calculate ratings of contents of each region based on the region information. Accordingly, a different highest rating content may be determined according to a time zone or a region.

For example, when content 1 is selected in the A region as the highest rating content and content 2 is selected in the B region as the highest rating content, the server device 200 notifies the display devices in the A region and the B region of the highest rating contents of each regions.

Figure 8:
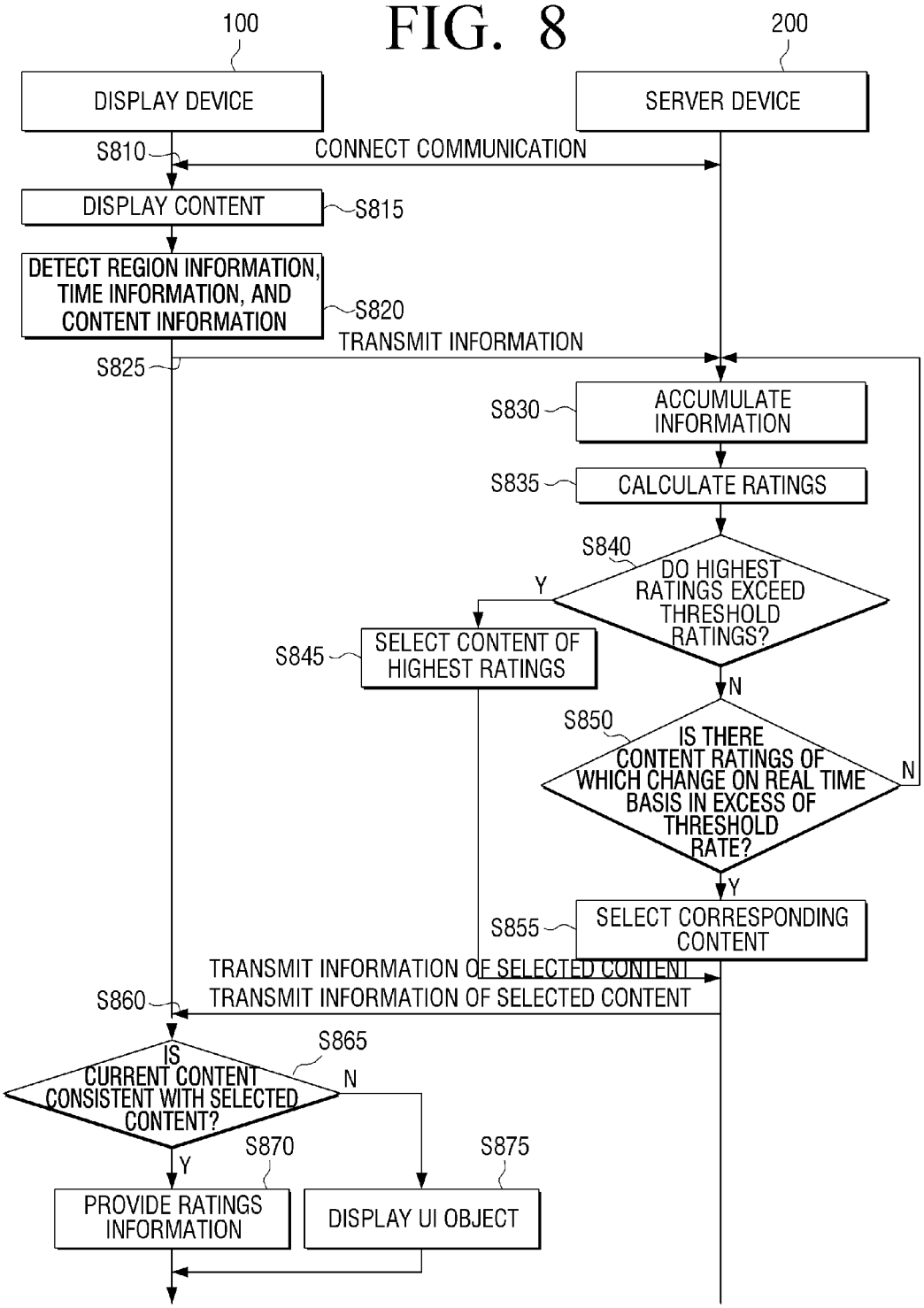
FIG. 8 is a timing chart illustrating a method for providing a service of the system of FIG. 7 in detail.

FIG. 8 is a timing chart illustrating a method for providing a service of the system in detail according to an exemplary embodiment. Referring to FIG. 8, the display device 100 and the server device 200 are connected with each other to establish communication at operation S810, and when content is displayed on the display device 100 at operation S815, the display device 100 detects region information, time information, and content information at operation S820. The region information or time information may be obtained through a source device providing the corresponding content, a base station relaying information indicating the region where the display device 100 is located, a global positioning system (GPS) chip provided in the display device 100, a timer, etc.

The display device 100 transmits such information to the server device 200 at operation S825. The server device 200 accumulates and stores the transmitted information at operation S830. Although only the single display device 100 is illustrated in FIG. 8, a plurality of display devices 100 may be provided in each region as shown in FIG. 7. The server device 200 may store the information transmitted from each display device 100 separately according to a region and a time zone.

When the information is accumulated (for example, to more than a predetermined level), the server device 200 calculates ratings using the accumulated information at operation S835. For example, the server device 200 may accumulate and store the information for a predetermined time, for example, 10 minutes, 30 minutes, 1 hour, etc., and may calculate ratings based on the stored information when a predetermined time period arrives.

The server device 200 selects content that has ratings satisfying a predetermined condition from among the calculated ratings. The predetermined condition may be set variously as described above.

In the example of FIG. 8, when at least one of the conditions of the highest ratings exceeding threshold ratings and the change rate in the real time ratings exceeding a threshold change rate is satisfied, the corresponding content is selected as the highest rating content. However, this is merely exemplary, and it is understood that many different conditions may be used. When at least one of the conditions are satisfied, the content may be selected as the highest rating content.

Specifically, the server device 200 selects the highest ratings that have the highest value from among the calculated ratings. The server device 200 determines whether the highest ratings exceed the predetermined threshold ratings at operation S840. The threshold ratings may be appropriately set considering typical results of analyzing ratings and viewers' propensities. For example, to prevent excessive and overly frequent transmissions of ratings which may interrupt viewing, relatively high threshold ratings may be set so that only certain programs meet the threshold ratings. On the other hand, when the threshold ratings are set too high, the ratings may not be transmitted often enough since so few programs may meet the threshold ratings. Accordingly, the threshold ratings may be appropriately set considering these situations, as well as other situations. For example, the threshold ratings may be set to 30%, or any other percentage which may achieve an appropriate balance. The threshold ratings may be set in the server device 200 as default values or may be frequently changed by the operator of the server device 200.

When the highest ratings exceed the threshold ratings, the server device 200 selects the content that has the highest ratings as the highest rating content at operation S845.

On the other hand, when the highest ratings do not exceed the threshold ratings, the server device 200 determines whether there is content in which a change rate in the real time ratings exceeds a threshold change rate at operation S850. That is, since users who view content may frequently change the content, moment ratings of the content may change in real time. In particular, in the case of an interesting content, the moment ratings may be much higher than average ratings. The moment ratings may be calculated by performing a differential operation. When content having lower ratings than other content abruptly goes up in the ratings for a short time, the server device 200 may calculate a change rate in the ratings for the content. The server device 200 may select the content having the change rate greater than the predetermined threshold change rate as the highest rating content at operation S855.

When the highest rating content is selected as described above, the server device 200 transmits information on the highest rating content to the display device 100 at operation S860. Although only one display device 100 is illustrated in FIG. 1, the server device 200 may select the highest rating content in each region and may transmit information to all of the display devices connected with the server device 200 in each region.

When the display device 100 receives the information on the highest rating content, the display device 100 determines whether the current content that the user is viewing is consistent with (e.g., the same as) the highest rating content at operation S865. When the current content is consistent with the highest rating content, the display device 100 provides rating information at operation S870, and when the current content is not consistent with the highest rating content, the display device 100 displays a UI object to change the content at operation S875.

As described above, the UI object may be provided in various forms. Hereinafter, a method for providing the UI object will be explained in detail.

Figure 9:
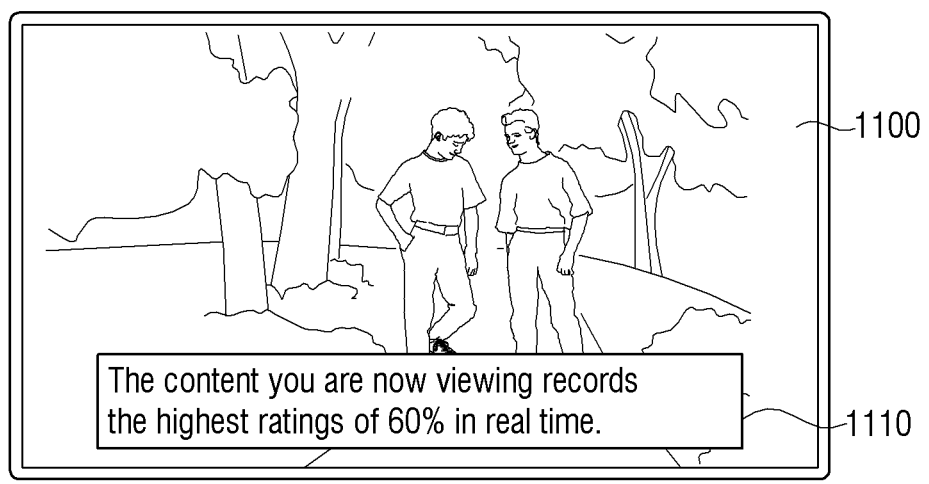
FIG. 9 is a view illustrating an example of a method for providing rating information.
Figure 10:
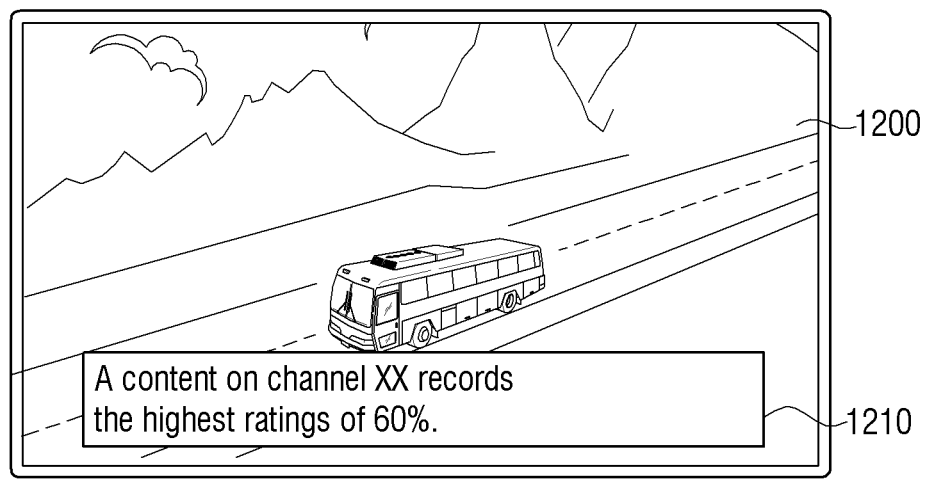
FIG. 10 is a view illustrating an example of a UI object.

FIGS. 9 and 10 illustrate various UI messages which are displayed on a border of the screen. Referring to FIG. 9, when the current content is consistent with the highest rating content, the controller 120 displays rating information 1110 indicating a percentage of the positive ratings associated with the current content on one border of a current screen 1100.

Although the rating information is displayed on the lower border in FIG. 9, the rating information 1110 may be displayed on the center of the screen or may be displayed on the right or left border or upper border according to a size or an aspect ratio of the display 110 or a kind of the display device 100. After displaying the rating information 1110, the controller 120 may remove the rating information automatically when a predetermined time elapses (for example, 5 seconds). It is understood that many different types of UIs may be displayed.

In the above-described example, upon receiving the information on the highest rating content from the server device 200, the display device 100 directly displays the rating information. However, exemplary embodiments are not limited thereto. Alternatively, for example, the controller 120 may display the rating information only when the user inputs a confirm command using a button provided on the remote controller or a body of the display device 100.

FIG. 10 is a view illustrating an operation when the current content is not consistent with the highest rating content. Referring to FIG. 10, the controller 120 displays a UI object 1210 to indicate channel information of the highest rating content or a name of the highest rating content on a border of a screen 1200. As described above, the display position of the UI object 1210 is not limited to the lower border and the UI object 1210 may be displayed on the center of the screen, the upper, left, or right border, or anywhere else on the screen.

The user can rapidly ascertain the channel broadcasting the highest rating content through the UI object 1210, and may directly tune to the channel and view the content.

Although the UI object 1210 of FIG. 10 is exemplarily shown in a simple guide message form, the UI object may be displayed along with a menu to enable a user to directly change to the highest rating content.

Figure 11:
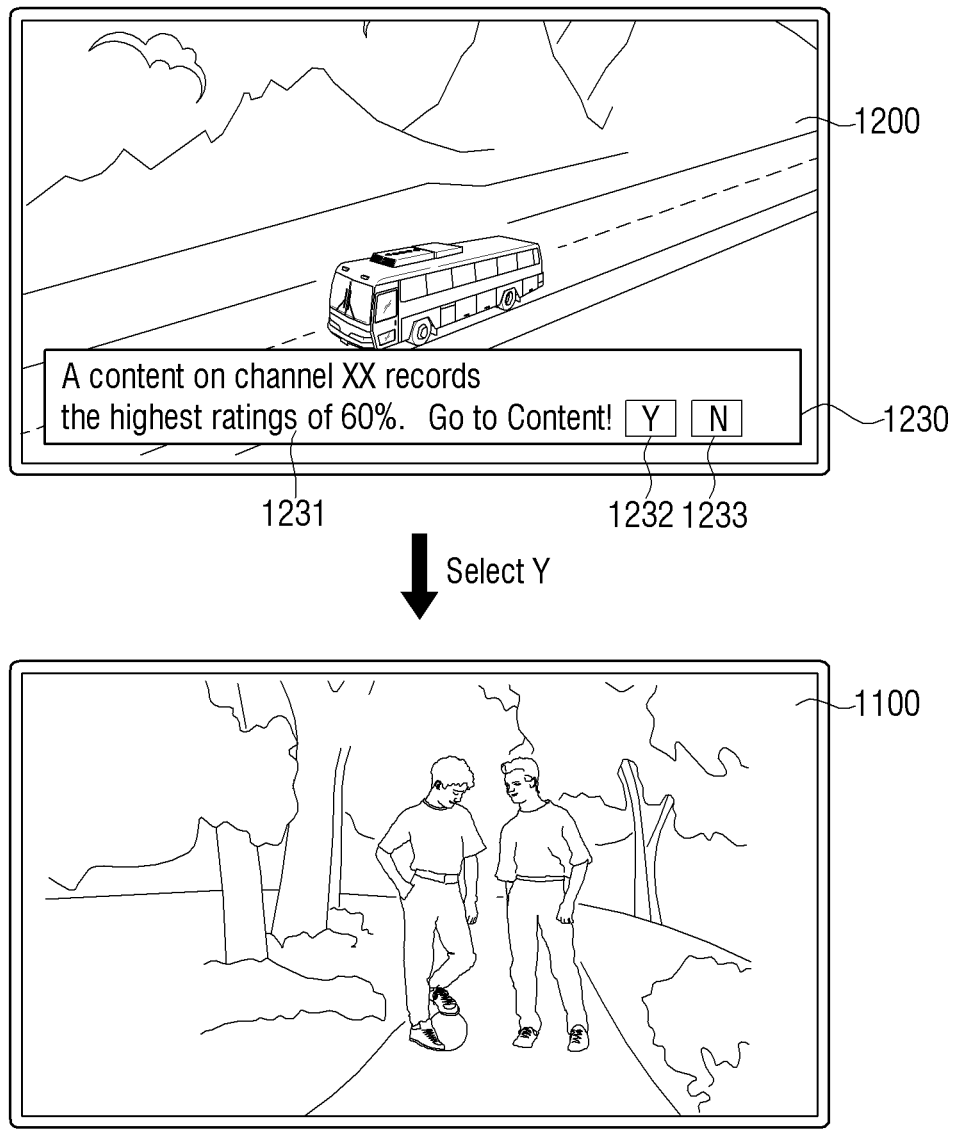
FIGS. 11 to 13 are views illustrating UI objects of various configurations and a method for changing content using the same.

FIG. 11 illustrates an example of a UI object which includes a short cut menu. Referring to FIG. 11, the display device 100 displays a UI object 1230 on one border of the screen 1200. The UI object 1230 includes a guide message 1231 regarding the highest rating content, a first menu item 1232 enabling a user to directly change to the highest rating content, and a second menu item 1233 enabling a user to delete the UI object 1230.

When the user selects the first menu item 1232, the controller 120 directly changes the current content to the screen 1100 of the highest rating content and displays the same.

Figure 12:
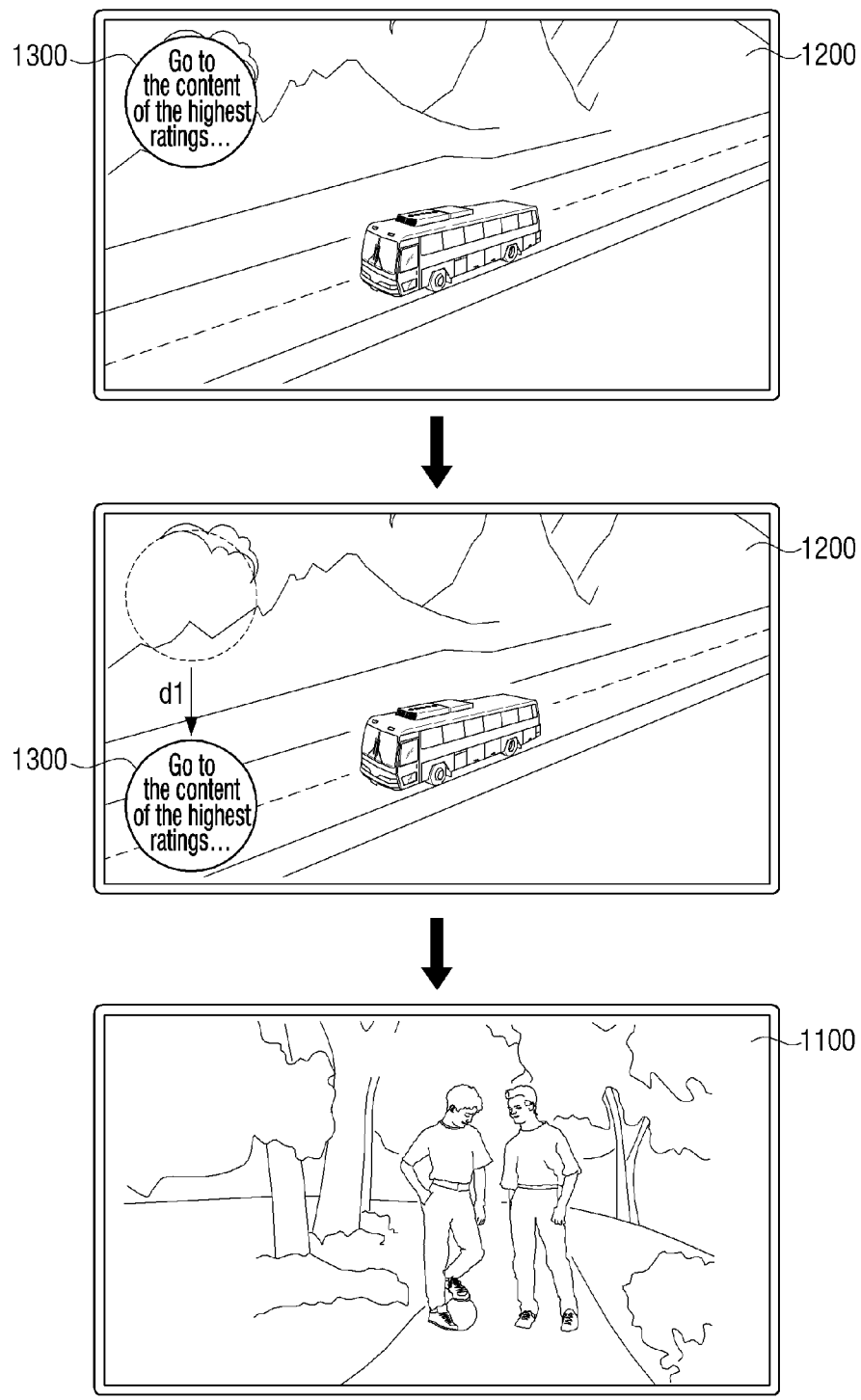

FIG. 12 illustrates an example of a UI object which is displayed on a corner of a screen. As shown in FIG. 12, a UI object 1300 may be displayed on one corner of the screen 1200. In this case, when the user manipulates the UI object 1300 in a predetermined fashion, the current content is automatically changed to the screen 1100 of the highest rating content while the UI object 1300 moves on the screen 1200 in one direction (d1).

For example, the user may directly touch the UI object 1300 with the user's hand or a touch pen, may drag in the direction of d1, or may manipulate a direction key or a confirm key provided on the remote controller to change the screen. It is understood that other types of manipulation may also be performed.

In addition, when the user drags the UI object 1300 on a touch pad provided on the remote controller in the direction of d1, the controller 120 may change the screen while moving the UI object 1300 as shown in FIG. 12.

Although the full screen is changed in the example shown in FIG. 12, the controller 120 may display the screen of the highest rating content and the original output screen on a single screen in a Picture In Picture (PIP) method or a Picture By Picture (PBP) method.

Figure 13:
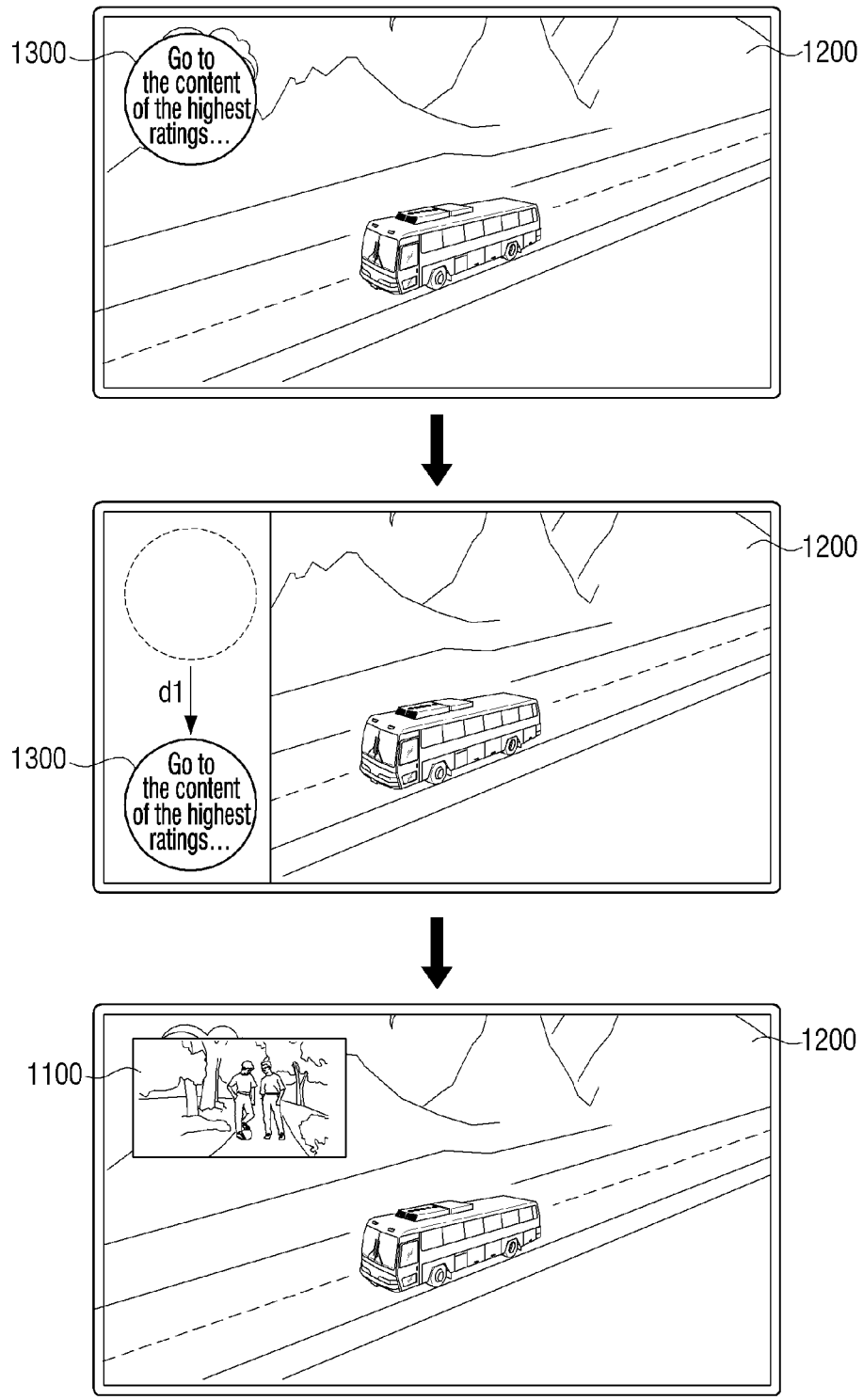

FIG. 13 is a view illustrating an operation of the display device in this example. Referring to FIG. 13, when the UI object 1300 is displayed on one side of the screen 1200 and a predetermined user manipulation is input, the controller 120 displays a sub screen 1100 in the screen 1200 while moving the UI object 1300 in the direction of d1. The sub screen 1100 may be the screen of the highest rating content. In this state, when the user selects the sub screen 1100, the controller 120 enlarges the sub screen 1100 into the full screen and displays the screen.

The display device 100 may be controlled by a user manipulation which is input through the remote controller. In this case, when the UI object is displayed and a predetermined user manipulation is input through the remote controller for controlling the display device, the current content may be changed to the highest rating content. The user manipulation according to exemplary embodiments may include various types of control operations, such as pressing a button provided on the remote controller, touching a touch screen provided on the remote controller, a voice input manipulation, a motion input manipulation, etc.

Figure 14:
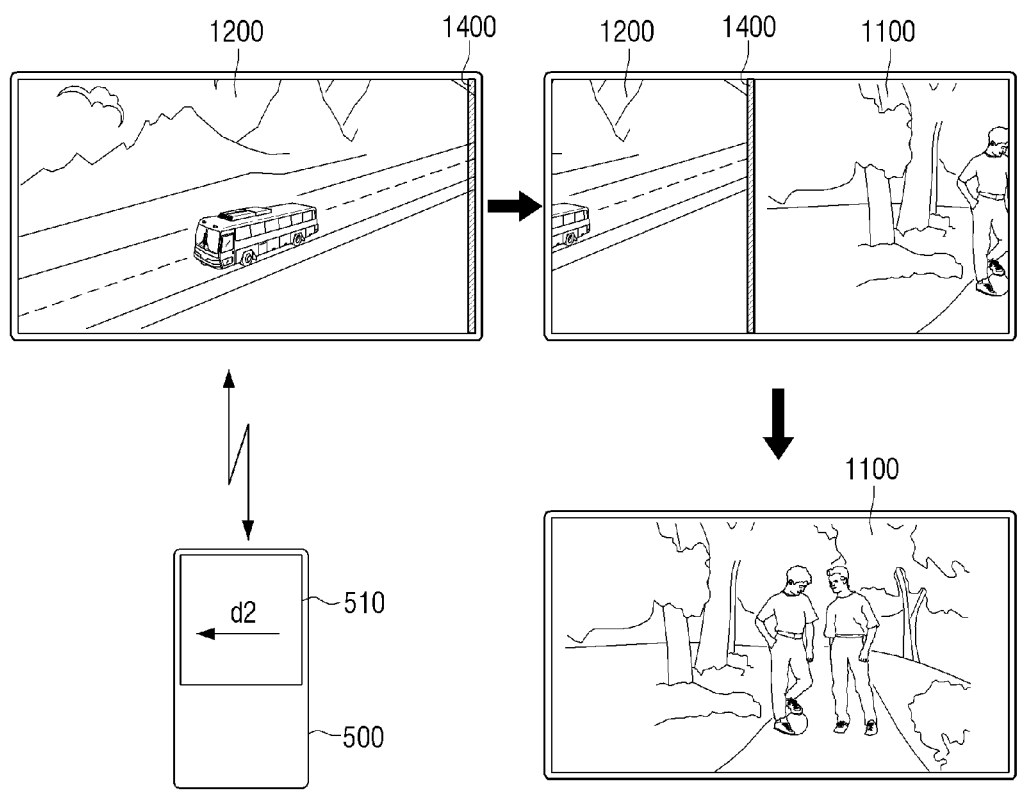
FIG. 14 is a view illustrating a method for changing content using a remote controller.

FIG. 14 is a view illustrating a method for changing content using a remote controller. Referring to FIG. 14, a UI object may be displayed in the form of a highlight mark without displaying separate text.

Specifically, when the current content is not consistent with the highest rating content, the controller 120 displays a highlight mark 1400 on a boundary part of one border of the screen 1200 of the display 110. In FIG. 14, the highlight mark 1400 is displayed on a boundary part of the right border. The highlight mark 1400 refers to a region that shines in a specific color.

The display device 100 may be controlled by a control signal which is transmitted from a remote controller 500. The remote controller 500 may be equipped with a touch screen 510. The user may input a touch manipulation on the touch screen 510 in a predetermined direction. Specifically, when the highlight mark 1400 is displayed on the right border as shown in FIG. 14, the user may input various manipulations, such as a touch and drag manipulation or a flick manipulation, in a direction of d2 to move the highlight mark 1400 to the center of the screen. When the user manipulation is input, the remote controller 500 transmits a control signal corresponding to the user manipulation to the display device 100.

The controller 120 gradually changes the previous screen 1200 to the screen 1100 of the highest rating content in sequence, while moving the highlight mark 1400 to the left according to the user manipulation. Accordingly, when the screen 1200 is turned over to the screen 1100 of the highest rating content, the highlight mark 1400 disappears.

When the remote controller is used, the display device 100 may inform the user of the highest rating content using the remote controller 500.

Figure 15:
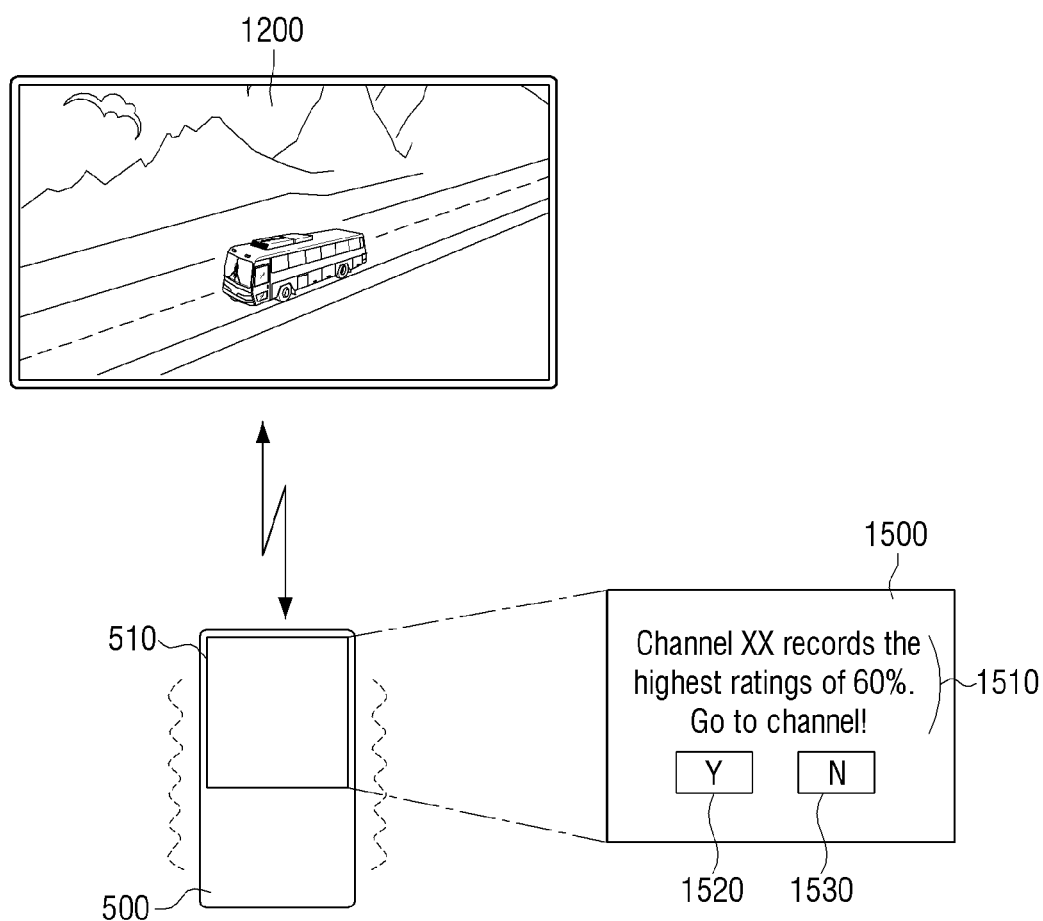
FIG. 15 is a view illustrating a method for notifying a user through a remote controller.

FIG. 15 is a view illustrating a method for notifying a user using a remote controller. Referring to FIG. 15, when the display device 100 displays the screen 1200 of content other than the highest rating content, the controller 120 transmits information on the highest rating content to the remote controller 500.

When the information is received, the remote controller 500 may display a UI object regarding the highest rating content through the touch screen 510, while providing vibration feedback. The UI object 1500 may include a guide message 1510 indicating a variety of information such as a channel of the highest rating content and rating information of the content, a menu item 1520 enable a user to directly change the content, and a menu item 1530 enabling a user to delete the UI object 1500.

When the menu item 1520 enabling a user to directly change the content is selected, the remote controller 500 transmits a control signal to change the channel to the display device 100. The controller 120 directly changes the channel to the channel of the highest rating content according to the control signal.

Figure 16:
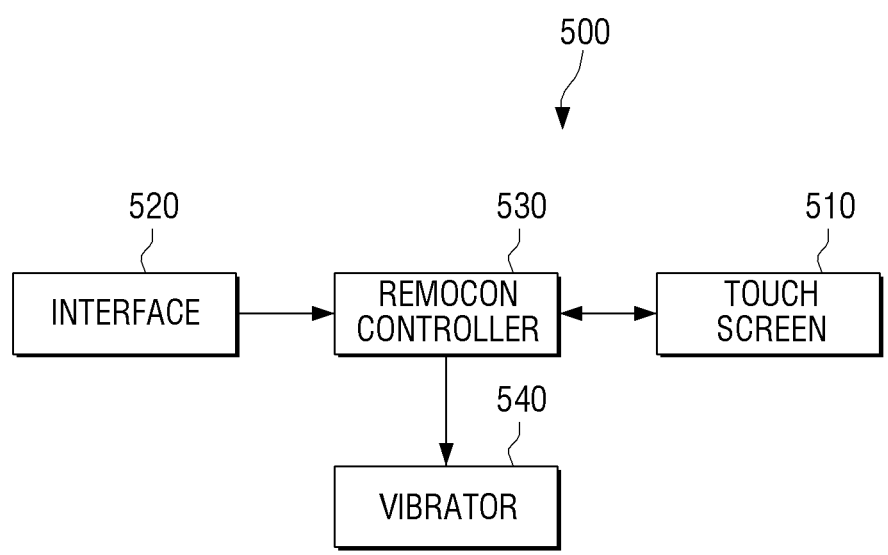
FIG. 16 is a block diagram illustrating a configuration of a remote controller according to an exemplary embodiment.

FIG. 16 is a block diagram illustrating a configuration of a remote controller according to an exemplary embodiment. Referring to FIG. 16, a remote controller 500 includes a touch screen 510, an interface 520, a remocon controller 530, and a vibrator 540. In addition, the remote controller 500 may further include various buttons or light emitting elements, but an illustration and an explanation thereof are omitted. According to exemplary embodiments, the remote controller 500 may be configured as a component installed within many different types of other mobile devices, for example, cellular phones, tablets, laptops, etc. For example, the remote controller 500 may be implemented as a smart phone configured to control the display device 100.

The touch screen 510 is an element that displays various messages or receives user manipulations. The touch screen 510 may display the UI object as explained in FIG. 15, and, when a menu on the UI object is touched, may sense the touch point and may notify the remocon controller 530.

The interface 520 is an element that communicates with the display device 100. The interface 520 may communicate with the display device 100 using various wireless communication methods, such as, for example, Bluetooth, Wi-Fi, Near Field Communication (NFC), etc.

The remocon controller 530 is an element that controls an overall operation of the remote controller 500. When a user manipulation is input through a button (not shown) or the touch screen 510, the remocon controller 530 transmits a control signal corresponding to the user manipulation to the display device 100 through the interface 520. When the information on the highest rating content is received through the interface 520, the remocon controller 530 may generate a UI object indicating the information and may display the UI object on the touch screen 510.

The vibrator 540 is an element that provides vibration feedback under the control of the remocon controller 530. The vibrator 540 may include at least one piezoelectric element. The piezoelectric element is an element that, in response to an electric signal being input thereto, vibrates based on the electric signal. Accordingly, to inform the user about an event, the remocon controller 530 may control the vibrator 540 to vibrate the remote controller 500. Specifically, when the information on the highest rating content is received, the vibration feedback may be provided.

FIG. 16 illustrates a configuration of the remote controller which informs the user of the highest rating content using the touch screen along with the vibration feedback according to an exemplary embodiment. However, exemplary embodiments are not limited thereto. That is, the remote controller may output a notice signal through a speaker and may notify the user instead of using the vibrator 540. Also, the remote controller may receive the user manipulation using buttons, such as, for example, various directional buttons or a confirm button instead of using the touch screen 510.

As described above, when the user is not currently viewing the highest rating content, the user can be appropriately notified about the highest rating content by not only the display device but also the remote controller and can directly change the content when the user wants to.

As described above, the display device 100 may be implemented by using various kinds of devices. For example, the display device 100 may be implemented by using a broadcast receiving device which receives content through a broadcasting channel and outputs the content.

Figure 17:
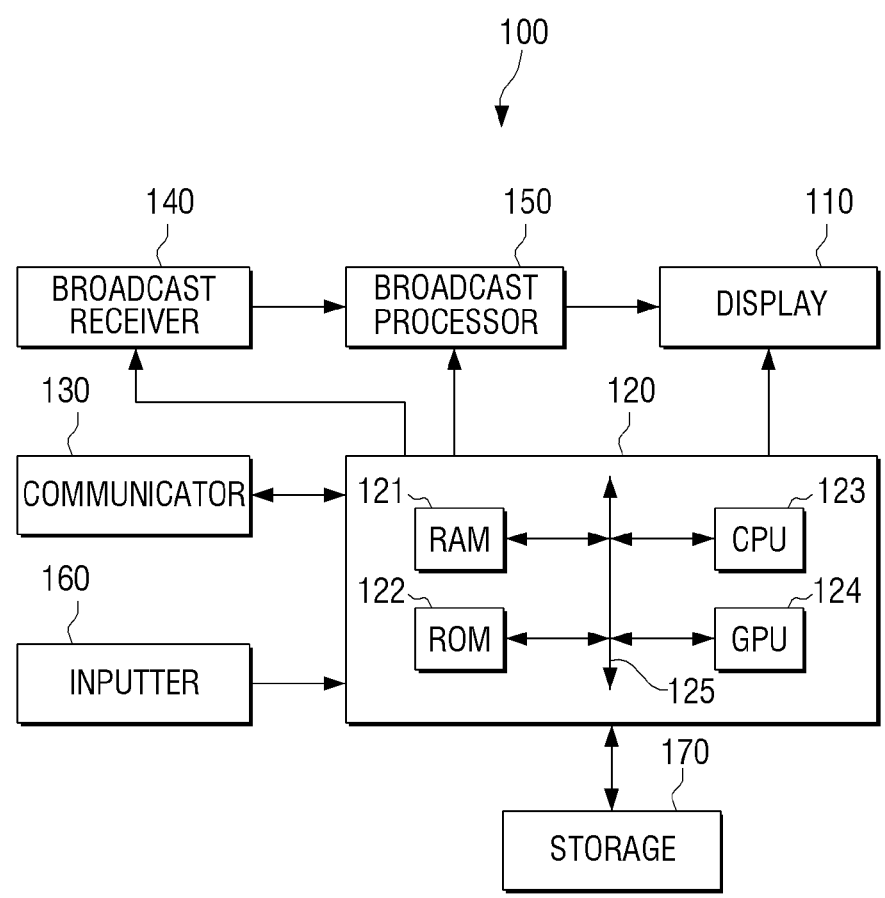
FIG. 17 is a view illustrating an example of a detailed configuration of a display device according to another exemplary embodiment.

FIG. 17 is a view illustrating a detailed configuration of a display device which is implemented by using a broadcast receiving device according to another exemplary embodiment.

Referring to FIG. 17, a display device 100 includes a display 110, a controller 120, a communicator 130, a broadcast receiver 140, a broadcast processor 150, an inputter 160, and a storage 170.

The display 110 and the communicator 130 have been described in detail in the above-described exemplary embodiments and thus a redundant explanation thereof is omitted.

The broadcast receiver 140 is an element that tunes to a broadcasting channel and receives content through the broadcasting channel. The broadcast processor 150 is an element that processes the content received through the broadcast receiver 140 and extracts an image and a voice from the content.

The broadcast receiver 140 and the broadcast processor 150 may have different configurations according to a broadcasting communication standard adopted in each country where the display device 100 is used. Currently, there are various digital broadcasting standards such as Advanced Television System Committee (ATSC), Digital Video Broadcasting (DVB), Integrated Services Digital Broadcasting-Terrestrial (ISDB-T), etc. For example, when the display 100 is used in a region where the ATSC standard is adopted, the broadcast receiver 140 may include an antenna, a radio frequency (RF) down converter, a demodulator, an equalizer, etc.

In the same example, the broadcast processor 150 may include a demultiplexer, a Reed-Solomon (RS) decoder, a deinterleaver, etc. The demultiplexer of the broadcast processor 150 separates video data, audio data, and normal data from the demodulated and equalized content. The RS decoder decodes each portion of the separated data and the deinterleaver deinterleaves the decoded data using a predetermined interleaving rule, thereby recovering the video data, audio data, and normal data. The display 110 displays the recovered video data and normal data. The audio data may be output through a speaker (not shown). Since detailed configurations for transmitting and receiving signals according to respective broadcasting standards are disclosed in standard documents of the broadcasting standards, a detailed illustration and explanation thereof are omitted.

The inputter 160 is an element that receives a signal transmitted from the remote controller 500 and a signal input through a button provided on the body of the display device 100, and transmits the signals to the controller 120. The controller 120 may perform various operations according to a signal input through the inputter 160.

The storage 170 may store various programs and data which are used in the display device 100. In particular, according to an exemplary embodiment, when the information on the highest rating content is received through the communicator 130, but the content is not viewed, the storage 170 may store the information.

When a predetermined event occurs, the controller 120 may display a recommendation message recommending that the user should view the highest rating content on the display 110 based on the information stored in the storage 170. According to exemplary embodiments, the event may be an event in which a turn on or turn off command is input to the display device 100, an event in which a predetermined time period (for example, 9 o'clock at night) arrives, an event in which the user selects a menu to identify a recommendation content, an event in which the number of stored highest rating contents reaches a predetermined number, etc. Accordingly, even when the user does not directly identify the highest rating content at a certain time, the user can identify one or several of the highest rating contents altogether at a later time.

Referring to FIG. 17, the controller 120 includes a Random Access Memory (RAM) 121, a Read Only Memory (ROM) 122, a Central Processing Unit (CPU) 123, a Graphic Processing Unit (GPU) 124, and a bus 125. Specifically, the controller 120 may be configured as a system on chip (SoC) including these elements. The RAM 121, the ROM 122, the CPU 123, and the GPU 124 may be connected to one another through the bus 125.

The CPU 123 accesses the storage 170 and performs booting using an operating system (O/S) stored in the storage 170. The CPU 123 executes various programs stored in the storage 170 according to a control signal input through the inputter 160, and may perform various operations using pre-stored contents or data.

The ROM 122 stores a set of commands to boot the system. When a turn on command is input and power is supplied, the CPU 123 copies the O/S stored in the storage 170 into the RAM 121 according to a command stored in the ROM 122, executes the O/S, and boots the system. When the booting is completed, the CPU 123 copies various programs stored in the storage 170 into the RAM 121, executes the programs copied into the RAM 121 and performs various operations. These programs may include a program which extracts information on current content, generates additional information such as region information or time information, and transmits the above information to the server device 200, a program which, upon receiving the information on the highest rating content from the server device 200, compares the highest rating content with the current content, a program which controls the GPU 124 to generate a graphic user interface (GUI) indicating a UI object or rating information according to a result of the comparing, etc. The CPU 123 performs the operations described in the above-described various exemplary embodiments by executing these programs.

The GPU 124 may display various screens under the control of the CPU 123. Specifically, the GPU 124 may generate a UI object or rating information using a calculator (not shown) and a renderer (not shown). The position of the generated UI object or rating information may be set in various locations, such as on the border, corner, or center of the screen as described in the above-described exemplary embodiments. The calculator calculates attribute values such as coordinate values of objects to be displayed according to a layout of the screen, shape, size, and color. The renderer generates a map screen including respective objects based on the attribute values calculated by the calculator. The screen generated by the renderer is provided to the display 110 and is superimposed on the screen of the content.

When the user selects a menu item to directly view the highest rating content indicated in the UI object, the CPU 123 controls the broadcast receiver 140 to tune to the channel broadcasting the highest rating content.

Figure 18:
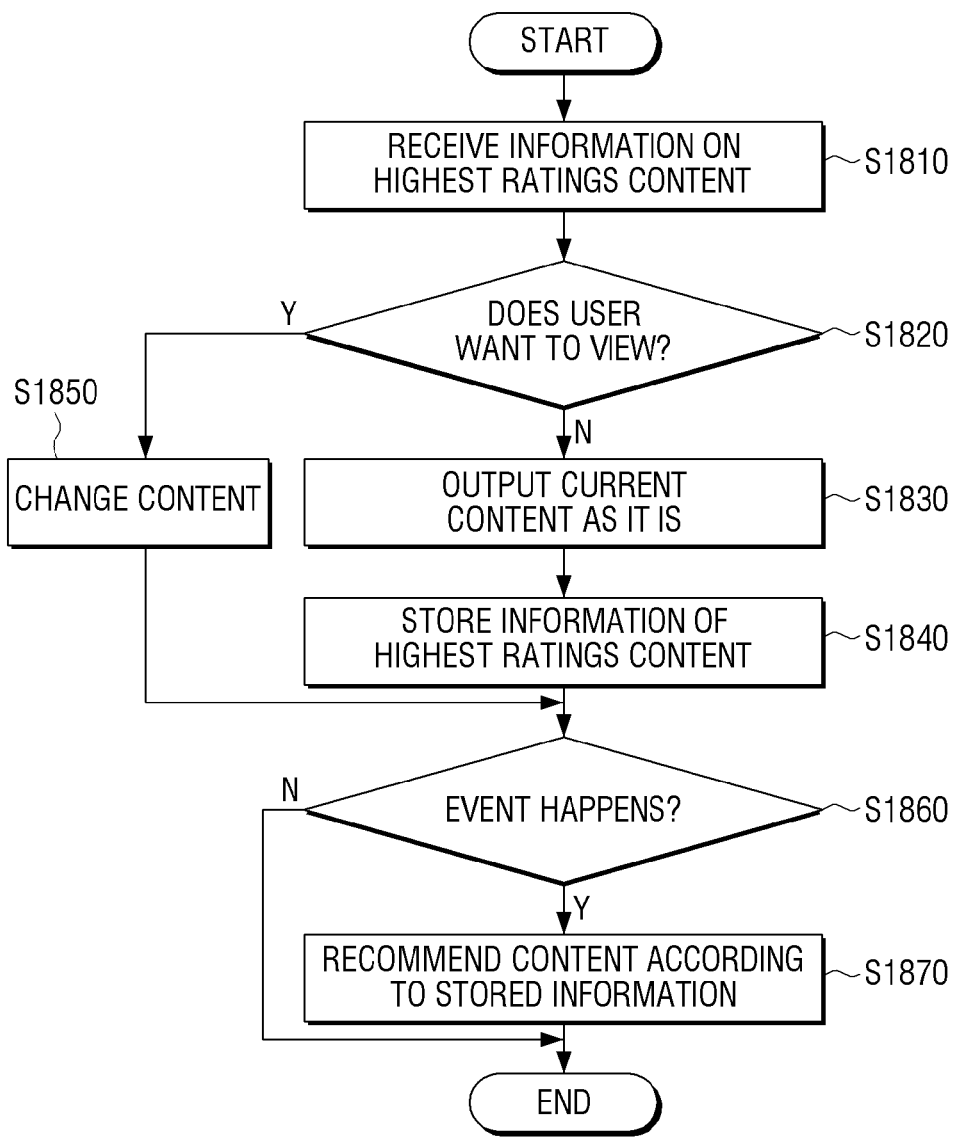
FIG. 18 is a flowchart illustrating a method for displaying content of a display apparatus according to another exemplary embodiment.

FIG. 18 is a flowchart illustrating a method for displaying content of the display device according to the exemplary embodiment of FIG. 17. Referring to FIG. 18, the display device 100 receives information on a highest rating content at operation S1810. When the user performs a user manipulation indicating that the user wishes to view the highest rating content at operation S1820, the display device 100 changes a current content to the highest rating content at operation S1850.

On the other hand, when the user does not perform the user manipulation to change the content, the display device 100 may continue to output the current content that the user is viewing at operation S1830. The display device 100 also stores the information on the highest rating content at operation S1840.

The information on the highest rating content may include a variety of information such as information on a channel broadcasting the content, time information, and a content name. Also, when the display device 100 includes a plurality of tuners, the controller 120 may tune to the channel of the highest rating content using a tuner other than the tuner tuning to the channel of the current content, and may receive the content. Accordingly, the controller 120 may store not only the information on the highest rating content but also the content in the storage 170.

In this state, when a predetermined event occurs at operation S1860, the display device 100 recommends contents according to the stored information at operation S1870. In this case, the display device 100 may exclude the content that the user has viewed from the recommendation contents. For example, when content A is the highest rating content at 2 p.m., content B is the highest rating content at 3 p.m., and content C is the highest rating content at 3:30 p.m, and the user has already viewed content B from among these contents, the display device 100 may recommend only contents A and C. The event may include various events, such as an event in which a turn on or turn off command is input to the display device 100, an event in which a predetermined time or time period arrives, an event in which the user selects a menu to identify the recommendation content, an event in which the number of stored highest rating contents reaches a predetermined number, etc., as described above.

The information on the highest rating content may be stored according to exemplary embodiments. In this case, the user may look for the content again at a later time. When the content itself is stored, the user may play back the content stored in the storage 170 directly and view the content. Also, only a part of the content that records the highest ratings may be stored, instead of storing the entire content. For example, when content A records the highest moment ratings from 10 minutes to 15 minutes after play back is initiated, the controller 120 may extract only a part of content A corresponding to the highest moment ratings and may store the part in the storage 170, and may capture at least one image frame of the part of the content and may store the image frame in the storage 170.

In the above-described exemplary embodiment, the server device 200 collects the information on the content from the display device 100 and calculates the ratings directly. However, according to another exemplary embodiment, the server device 200 may collect the rating information from an external device other than the display device 100.

Figure 19:
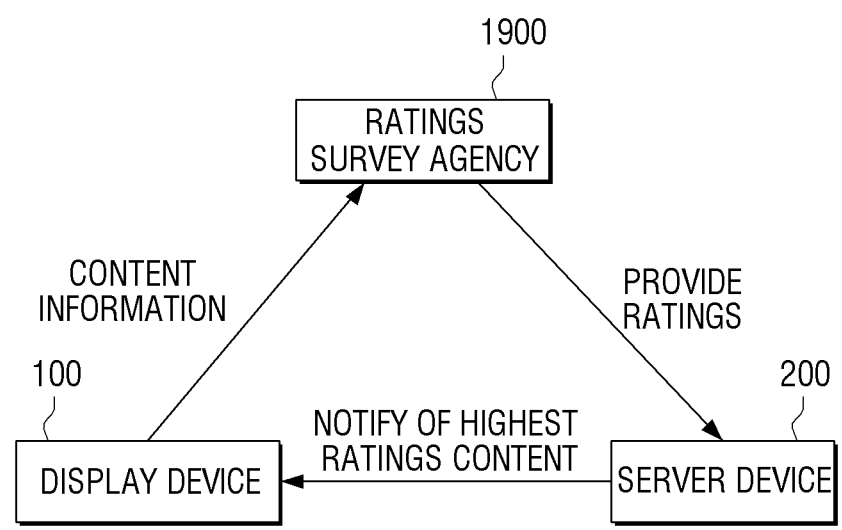
FIG. 19 is a view illustrating a configuration of a service providing system according to another exemplary embodiment.

FIG. 19 is a block diagram illustrating a configuration of a service providing system according to another exemplary embodiment. Referring to FIG. 19, the system includes a display device 100, a server device 200, and a rating survey agency 1900.

According to an exemplary embodiment, the rating survey agency 1900 is a database system that is run by a specialized agency for surveying ratings of contents broadcasting in each region and each time zone. The rating survey agency 1900 may survey the ratings using various techniques, such as a telephone survey method, a diary survey method, a people meter method, etc. According to an exemplary embodiment, the people meter method refers to a method in which an electrosensitive device called a people meter is added to a broadcast receiving device in household and data is automatically collected. For example, the service providing system shown in FIG. 19 may employ a ratings survey method using the people meter method. When a chip performing the people meter function is embedded in the display device 100 or is externally connected with the display device 100, information on the content that the user is viewing through the display device 100 is transmitted to the rating survey agency 1900 in real time.

The rating survey agency 1900 provides surveyed ratings to the server device 200. Accordingly, the server device 200 grasps the ratings of each of the plurality of contents in real time.

The server device 200 selects content that satisfies a predetermined condition from among these contents as a highest rating content, and notifies the display device 100 of this content. Accordingly, the display device 100 displays a UI object or rating information as described above, and allows the user to select a broadcast program according to the user's desires, according to any of the above-described exemplary embodiments.

Figure 20:
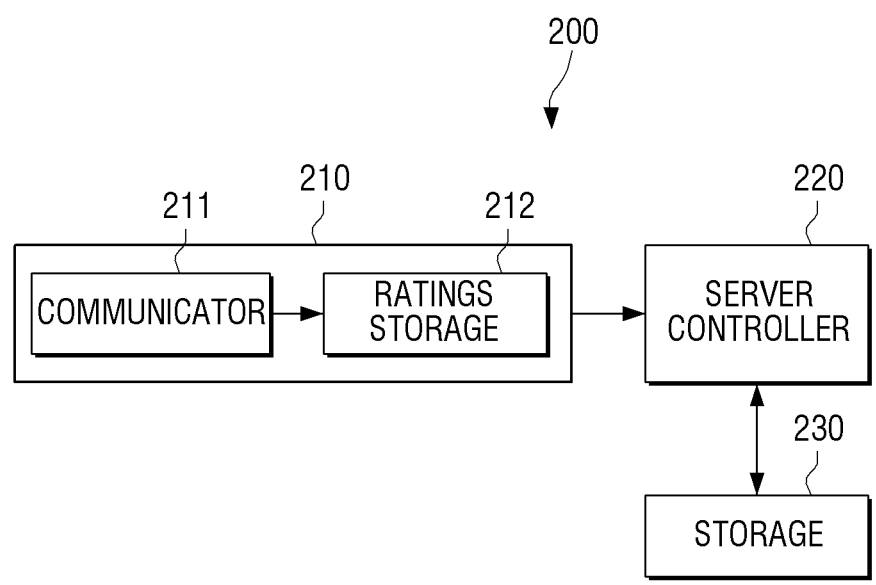
FIG. 20 is a block diagram illustrating a configuration of a server device used in the system of FIG. 19.

FIG. 20 is a block diagram illustrating a configuration of the server device 200 shown in FIG. 19. Referring to FIG. 20, the server device 200 includes a rating collector 210, a server controller 220, and a storage 230.

The rating collector 210 is an element that receives a plurality of contents from the rating survey agency 1900. Specifically, the rating collector 210 includes a communicator 211 to communicate with the rating survey agency 1900, and a rating storage 212 to store rating information received through the communicator 211.

The server controller 220 identifies ratings associated with each unit of content stored in the rating storage 212 and determines whether the content satisfies a predetermined condition. When the predetermined condition is satisfied, the server controller 220 selects the content as the highest rating content and notifies the display device 100 of the information related to the selected content through the communicator 211.

The server controller 220 may separately store the information related to the highest rating content in the storage 230. Accordingly, every time that a predetermined time period arrives, the server controller 220 may provide recommendation content information to the plurality of display devices based on the information stored in the storage 230. According to an exemplary embodiment, the recommendation content information is information for informing a user about content which is the highest rating content in each time zone and each region. The server controller 220 may exclude the content that the user has viewed from among the stored highest rating contents, and may provide the recommendation content information regarding only the other contents.

The recommendation may be provided on the basis of an entire content. Alternatively, the recommendation may be provided on the basis of a part of a single content that records the highest ratings. For example, when content A records the highest moment ratings from 10 minutes to 15 minutes after play back of content A is initiated, only the part of the content corresponding to the highest moment ratings may be recommended.

In the above-described exemplary embodiments, the storage 230 is included in the server device 200 shown in the exemplary embodiment of FIG. 20. However, it is understood that storage units may be located elsewhere as well, for example, the server device 200 of FIG. 4 may further include a storage, or the storage may be located at an external entity. Accordingly, the server device 200 may recommend the highest rating content that the user has not viewed.

Figure 21:
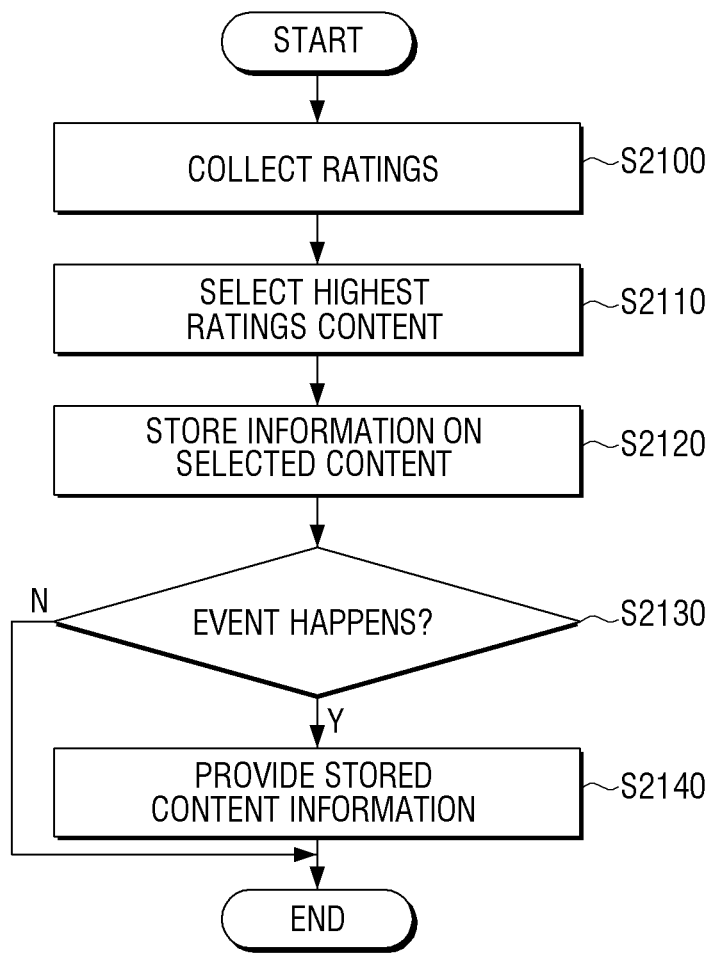
FIG. 21 is a flowchart illustrating a method for providing a service of the server device of FIG. 20.

FIG. 21 is a flowchart illustrating a method for providing a service of a server device according to another exemplary embodiment. Referring to FIG. 21, the server device 200 collects ratings based on information which is provided by a rating survey agency or a display device at operation S2100.

The server device 200 compares the collected ratings with a predetermined condition and selects a highest rating content at operation S2110. The condition for determining the highest rating content has been described above and thus a redundant explanation thereof is omitted.

When the highest rating content is selected, the server device 200 stores information on the highest rating content at operation S2120. In this state, when a predetermined event occurs at operation S2130, the server device 200 provides the stored content information to each of the display devices at operation S2140. The event may include various types of events, such as an event in which a predetermined time or time period arrives, an event in which a recommendation request is transmitted from the display device, an event in which a manager of the server device inputs a recommendation command, an event in which a new display device accesses the server device, etc. Each of the display devices which receives recommendation content information displays the content information and may recommend the same to the user.

According to the various exemplary embodiments described above, the user can easily ascertain the ratings of content in real time and can view the content without missing an important scene. Accordingly, the exemplary embodiments can greatly improve a user's viewing satisfaction.

The method for displaying the content or the method for providing the service according to the various exemplary embodiments described above may be coded as software and may be stored in a non-transitory readable medium. The non-transitory readable medium may be mounted in various devices and used.

Specifically, a program code for performing a method for displaying a content, including: displaying a content, transmitting information on the content to a server device, receiving information on a highest rating content from the server device, and when the content is not consistent with the highest rating content, displaying a UI object to change the content to the highest rating content, may be stored in a non-transitory readable medium and provided to various kinds of display devices.

Also, a program code for performing a method for providing a service, including: collecting ratings of a plurality of contents which are viewed through a plurality of display devices; selecting a content that has ratings satisfying a predetermined condition from among calculated ratings as a highest rating content, and notifying the plurality of display devices of information on the selected highest rating content, may be stored in a non-transitory readable medium and provided to a server device.

The non-transitory computer readable medium may be a medium that stores data semi-permanently rather than storing data for a very short time, such as a register, a cache, and a memory, and is readable by an apparatus. Specifically, the non-transitory computer readable medium may be, for example, a compact disc (CD), a digital versatile disk (DVD), a hard disk, a Blu-ray disk, a universal serial bus (USB), a memory card, a ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display device comprising:
   a storage;
   a communicator configured to transmit information related to content displayed on a display to a server device and receive information on a highest rating content, among a plurality of contents, from the server device, the content displayed on the display being displayed in real time; and
   a controller configured to display a user interface (UI) object, which enables a user to change the content to the highest rating content on the display without displaying rating information of the content displayed on the display, in response to determining that the content displayed on the display is not the highest rating content, and to display the rating information of the content displayed on the display in response to determining that the content displayed on the display is the highest rating content,
   wherein the controller is configured to store the information on the highest rating content in the storage, in response to the content displayed on the display not being changed to the highest rating content based on the UI object, and to display a recommendation message to recommend to a user to view the highest rating content on the display based on the information stored in the storage in response to an occurrence of a predetermined event, and
   wherein the highest rating content comprises content that ranks top in a moment ratings or top in a change rate in real time ratings.

2. The display device of claim 1, wherein the controller is configured to control the communicator to transmit region information of a region where the display device is located and time information to the server device along with the information related to the content,
   wherein the real time ratings are ratings for contents which are viewed in real time in the region where the display device is located, and wherein the highest rating content is content that also satisfies at least one other condition of a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other contents by more than a predetermined fourth threshold.

3. The display device of claim 1, wherein the UI object is displayed on a border of a screen of the display, and
   wherein the UI object comprises a message regarding the highest rating content and a menu which enables a user to change the content to the highest rating content.

4. The display device of claim 1, wherein the UI object comprises a circular object that is displayed on a corner in a screen of the display, and
   wherein, in response to determining that a user manipulation is input for the circular object, the controller is configured to display the highest rating content superimposed over a portion of the content in a Picture-In-Picture (PIP) form or a Picture-By-Picture (PBP) form and move a display position of the circular object.

5. The display device of claim 1, wherein the UI object is a highlight mark that is displayed on a boundary part of a border of a screen of the display, and
   wherein, when the highlight mark is displayed and in response to determining that a touch manipulation in a predetermined direction is input on a touch screen provided on a remote controller for controlling the display device, the controller changes the content to the highest rating content.

6. The display device of claim 1, wherein, when the UI object is displayed and in response to determining that a predetermined user manipulation is input on a remote controller for controlling the display device, the controller changes the content to the highest rating content.

7. A method for displaying content of a display device, the method comprising:
   displaying content on a display in real time;
   transmitting information related to the content to a server device;
   receiving information related to a highest rating content among a plurality of contents from the server device;
   displaying a user interface (UI) object, which enables a user to change the content to the highest rating content without displaying rating information of the content displayed on the display, in response to determining that the content displayed on the display is not the highest rating content;
   displaying the rating information of the content displayed on the display, in response to determining that the content displayed on the display is the highest rating content;
   storing the information related to the highest rating content, in response to the content displayed on the display not being changed to the highest rating content based on the UI object; and
   displaying a recommendation message to recommend to a user to view the highest rating content based on the stored information in response to an occurrence of a predetermined event,
   wherein the highest rating content comprises content that ranks top in a moment ratings or top in a change rate in real time ratings.

8. The method of claim 7, further comprising transmitting region information of a region where the display device is located and time information to the server device,
   wherein the real time ratings are ratings for contents which are viewed in real time in the region where the display device is located, and wherein the highest rating content is content that also satisfies at least one other condition of a second condition in which the highest ratings of the content exceed a predetermined first threshold, a third condition in which a change rate in the real time ratings of the content exceeds a predetermined threshold change rate, a fourth condition in which the lowest ratings of the content exceed a predetermined second threshold and the change rate in the real time ratings of the content exceeds the predetermined threshold change rate, a fifth condition in which average ratings from a start point of the content to an end point of the content exceed a predetermined third threshold, and a sixth condition in which the content has ratings greater than the ratings of other content by more than a predetermined fourth threshold.

9. The method of claim 7, wherein the UI object is displayed on a border of a screen of the display, and
wherein the UI object comprises a message regarding the highest rating content and a menu which enables a user to change the content to the highest rating content.

10. The method of claim 7, wherein the UI object comprises a circular object that is displayed on a corner in a screen of the display, and
wherein the displaying the content comprises, in response to determining that a user manipulation is input for the circular object, displaying the highest rating content superimposed over the content in a Picture-In-Picture (PIP) form or a Picture-By-Picture (PBP) form, and moving a display position of the circular object.

11. The method of claim 7, wherein the UI object is a highlight mark that is displayed on a boundary part of a border of a screen of the display, and
wherein the displaying the content comprises, when the highlight mark is displayed and in response to determining that a touch manipulation is input in a predetermined direction on a touch screen provided on a remote controller for controlling the display device, changing the content to the highest rating content.

12. The method of claim 7, further comprising, when the UI object is displayed and in response to determining that a predetermined user manipulation is input on a remote controller for controlling the display device, changing the content to the highest rating content.

* * * * *